United States Patent
Reati

(10) Patent No.: US 7,910,145 B2
(45) Date of Patent: Mar. 22, 2011

(54) PRECHARGED GROUND COFFEE CAPSULE, METHOD FOR ITS PRODUCTION AND APPARATUS FOR IMPLEMENTING SAID METHOD

(76) Inventor: Marco Reati, Signa (IT)

( * ) Notice: Subject to any disclaimer, the term of this patent is extended or adjusted under 35 U.S.C. 154(b) by 414 days.

(21) Appl. No.: 11/756,601

(22) Filed: May 31, 2007

(65) Prior Publication Data
US 2008/0299262 A1 Dec. 4, 2008

(51) Int. Cl.
B65B 29/02 (2006.01)
(52) U.S. Cl. ............ 426/77; 426/84; 426/425; 426/433; 426/432; 426/594; 426/595; 99/295; 99/323; 99/279
(58) Field of Classification Search .................. 426/77, 426/84, 433, 594, 595, 425, 432, 431; 99/295, 99/323, 279
See application file for complete search history.

(56) References Cited

U.S. PATENT DOCUMENTS

| | | | | |
|---|---|---|---|---|
| 3,445,237 A | * | 5/1969 | Gidge | 426/77 |
| 3,823,656 A | * | 7/1974 | Vander Veken | 99/295 |
| 4,136,202 A | * | 1/1979 | Favre | 426/77 |
| 5,656,311 A | * | 8/1997 | Fond | 426/84 |
| 5,897,899 A | * | 4/1999 | Fond | 426/112 |
| 6,740,345 B2 | * | 5/2004 | Cai | 426/77 |
| 2002/0048621 A1 | * | 4/2002 | Boyd et al. | 426/77 |
| 2005/0150390 A1 | * | 7/2005 | Schifferle | 99/295 |

FOREIGN PATENT DOCUMENTS

| EP | 1555218 A1 | * | 7/2005 |
|---|---|---|---|
| EP | 1579791 A1 | * | 9/2005 |

* cited by examiner

Primary Examiner — Jennifer C McNeil
Assistant Examiner — Hong Mehta
(74) Attorney, Agent, or Firm — Matthias Scholl P.C.; Matthias Scholl

(57) ABSTRACT

Taught herein are a precharged ground coffee capsule comprising a polygonal cross-section container body made of a liquid-impermeable material, the container body having an open end and a large axial opening formed in a bottom wall of the container body, two walls made of a liquid-permeable material being arranged on the open end and at the bottom wall respectively, the liquid-impermeable material comprising a metallic material support layer and a thermoplastic material layer, the thermoplastic material layer facing the interior of the container body, the permeable walls being coupled to the container body through the thermoplastic material layer, an outwardly projecting radial flange being provided at the open end of the container body; a method for producing the capsule; and an apparatus for implementing the method.

13 Claims, 5 Drawing Sheets

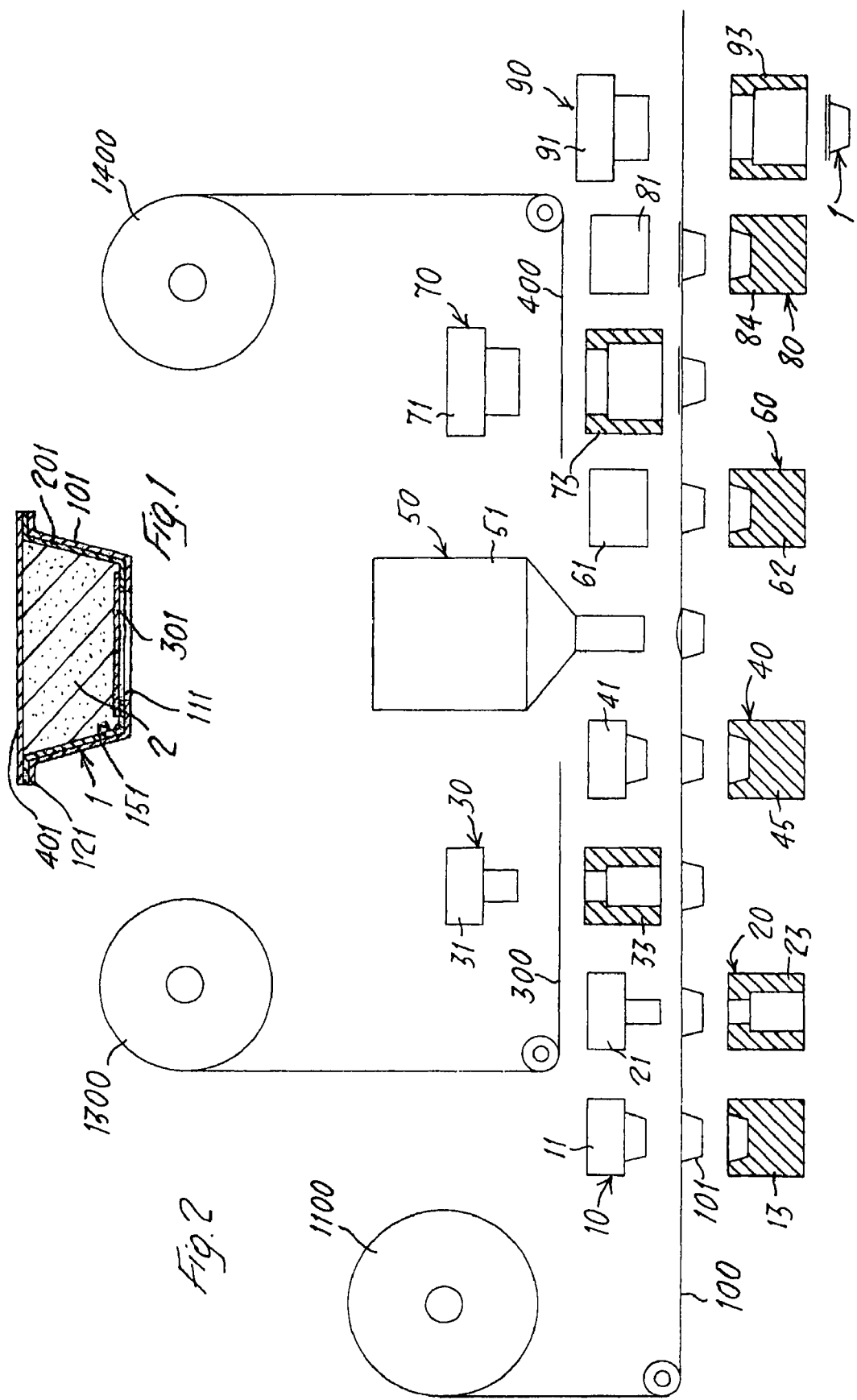

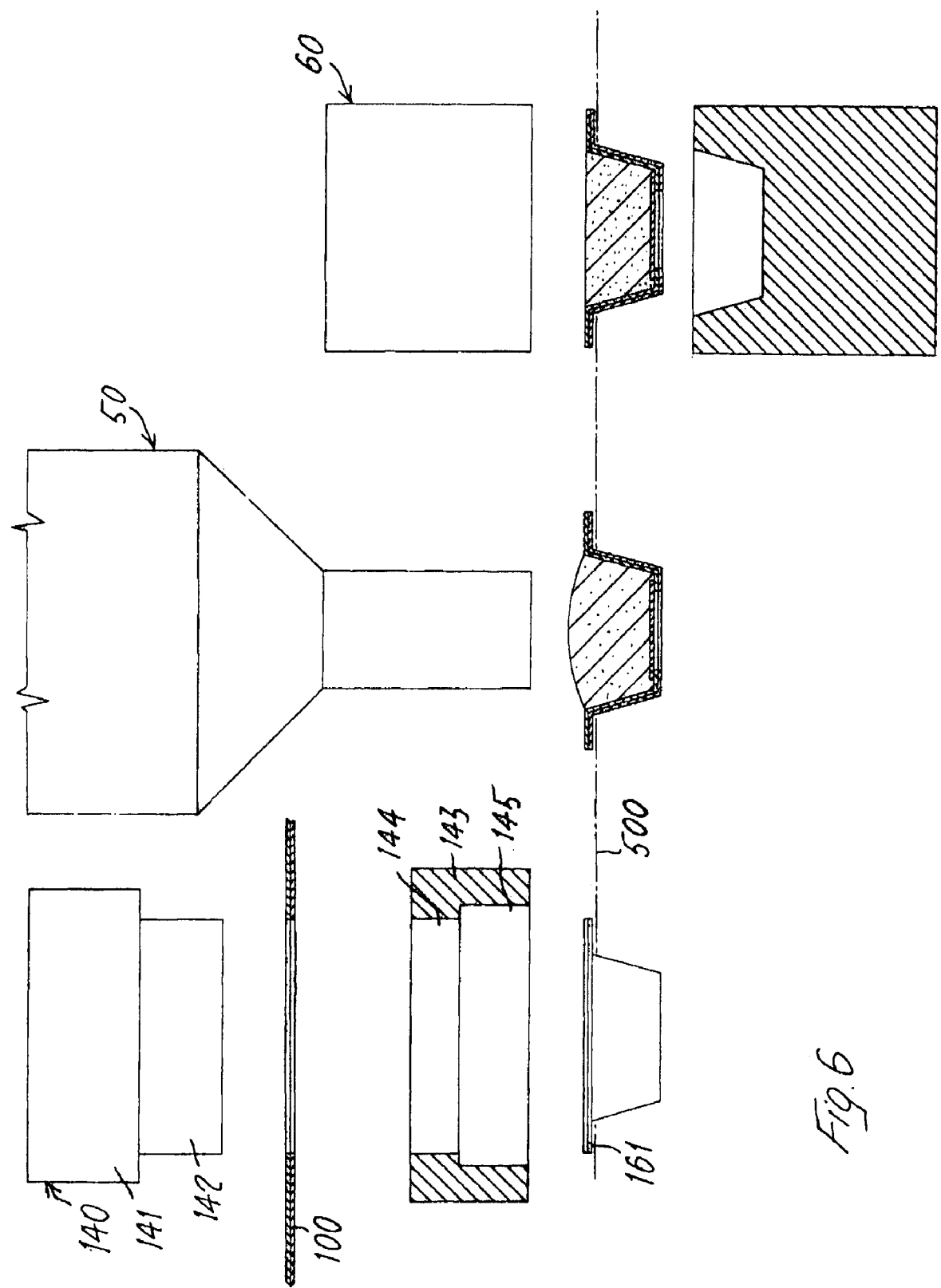

PRECHARGED GROUND COFFEE CAPSULE, METHOD FOR ITS PRODUCTION AND APPARATUS FOR IMPLEMENTING SAID METHOD

BACKGROUND OF THE INVENTION

1. Field of the Invention

The present invention relates to precharged ground coffee capsules, a method of production thereof, and an apparatus for implementing such method 2. Description of the Related Art Precharged ground coffee capsules are gaining more and more importance in the market since they are easy and practical to be used, and because each single ground coffee dose assures for a better maintenance of coffee fragrance. Precharged capsules can be projected for both espresso coffee machines and moka type coffee machines or the like; in the last years, the shape and structure of the different capsules have been widely developed because of different use and preservation requirements.

In the choice of the materials and structure to be imparted to a precharged capsule, a considerable problem is to determine a right balance between strength and effectiveness in use; in other terms, if water-permeable materials such as filter paper, non-woven fabric and the like allow for a good utilization of the capsule on one hand, they have considerable drawbacks regarding to preservation and positioning of the capsule in a capsule-holder on the other hand.

The majority of commercially available precharged capsules follow two main veins: in one case, the main container body is made of a plastic material while, in the other case, the container body is made of a metallic material. In either cases, it is necessary to adopt special measures to solve several problems that hamper the production and/or use of the different precharged capsules. For example, capsules with a container body made of a plastic material can comprise certain materials which are adapted to resist the heat load, and generally they have to be molded, filled and than covered with layers of a water-permeable material. Capsules made of a metallic material are easy to be formed and require a very short thickness on one hand; on the other hand, they are difficult to be matched with a suitable filtering material, and they also have a drawback to react with ground coffee and speed up the development of rancidity. In most cases, in order to achieve good results from the point of view of preservation and preparation of a coffee brew, the device used with the precharged capsule has to be modified to an extent which can also be considerable, so that the precharged capsule can be pierced or otherwise fluid-communicated with means for supplying hot water under pressure and/or means for dispensing the ground coffee brew.

An aim of the present invention is to provide a precharged ground coffee capsule which does not compromise the preservation state of ground coffee while being of a simple and inexpensive construction, such capsule being easy to be used with both common espresso coffee machines and "moka type" coffee machines without any special modification to the coffee machine used with the precharged capsule.

Another aim of the present invention is a method for producing ground coffee precharged capsules, which method can be carried out in a simplest way using a single operating unit without transferring semi-finished products from a machine to another one.

Another aim of the present invention is to provide an apparatus for implementing such new method of production.

SUMMARY OF THE INVENTION

Accordingly, an object of the present invention is a precharged ground coffee capsule comprising a polygonal cross-section container body, and preferably a circular cross-section container body, made of a liquid-impermeable material, said container body having an open end and a large axial opening formed in a bottom wall of said container body, two walls made of a liquid-permeable material being arranged on said open end and at said bottom wall respectively; said liquid-impermeable material comprises a metallic material support layer and a thermoplastic material layer, said thermoplastic material layer facing the interior of said container body, said permeable walls being coupled to said container body through said thermoplastic material layer, an outwardly projecting radial flange being provided at said open end of said container body.

Another object of the present invention is a method for producing a ground coffee precharged capsule, said method comprising the steps of:
  feeding a continuous ribbon of liquid-impermeable material and punching a cavity, thus forming a container body;
  shearing an opening in the bottom wall of said cavity;
  feeding a continuous ribbon of liquid-permeable material and shearing a piece of liquid-permeable material, said piece of liquid-permeable material being disposed in the bottom of said cavity;
  heat-welding said piece of liquid-permeable material to the bottom of said cavity;
  filling the said cavity with ground coffee;
  pressing said ground coffee into the said cavity;
  feeding a ribbon of liquid-permeable material and shearing a piece of the said material, said piece being disposed over said filled cavity;
  heat-welding said piece and liquid-permeable material to the top of said cavity; and
  shearing said liquid-impermeable material and releasing the so-formed precharged ground coffee capsule.

Another object of the present invention is an apparatus for producing precharged ground coffee capsules, said apparatus comprising:
  feeding means for feeding a continuous ribbon of liquid-impermeable material;
  punching means for punching a cavity in said continuous ribbon;
  shearing means for shearing an opening in the bottom of said cavity, and
  discharging means for discharging a corresponding scrap;
  feeding means for feeding a continuous ribbon of liquid-permeable material;
  shearing means for shearing a piece of liquid-permeable material, and positioning means for positioning said piece of liquid-permeable material within said cavity;
  welding means for welding said piece of liquid-permeable material to said cavity;
  feeding means and dosing means for feeding and dosing ground coffee in said cavity respectively;
  pressing means for pressing a coffee dose into said cavity;
  feeding means for feeding a continuous ribbon of liquid-permeable material;
  shearing means for shearing a piece of liquid-permeable material, and positioning means for positioning said piece of liquid-permeable material over said cavity filled with said pressed ground coffee dose;

welding means for welding said piece to said liquid-impermeable material; and shearing means for shearing said liquid-impermeable material, and releasing means for releasing the so-formed ground coffee precharged capsule.

BRIEF DESCRIPTION OF THE DRAWINGS

Other advantages and features of the device and method according to the present invention will be apparent from the following description of certain embodiments thereof, which are provided by way of illustration, and not by way of limitation, with reference to the accompanying drawings, wherein:

FIG. 1 is a sectioned view of an embodiment of a precharged capsule according to the present invention;

FIG. 2 is a schematic diagram showing an embodiment of the method for producing ground coffee precharged capsules according to the present invention;

FIG. 6 is an enlarged view of certain steps according to another embodiment of the method of the present invention.

DESCRIPTION OF THE PREFERRED EMBODIMENTS

Figure 3:
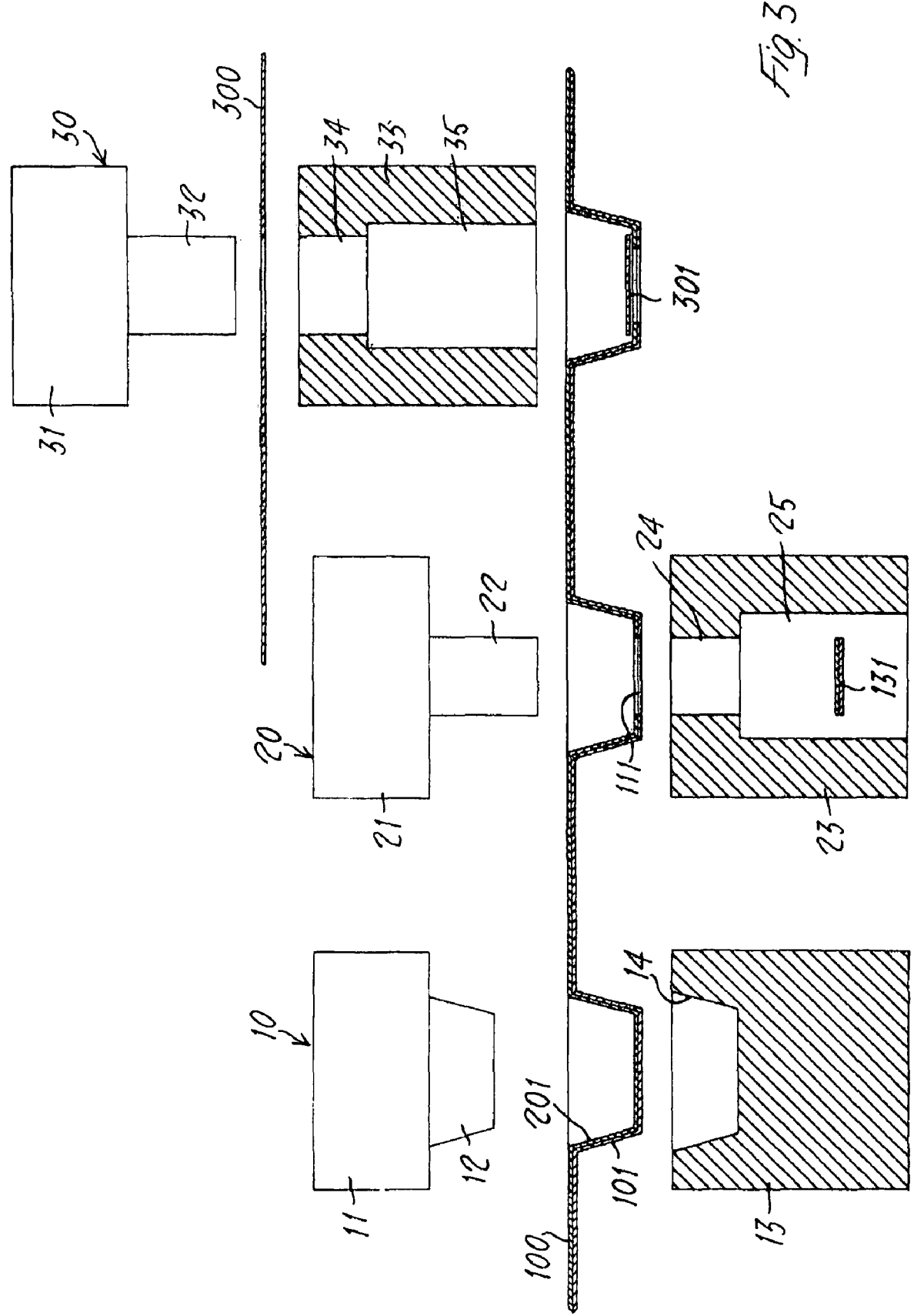
FIGS. 3 to 5 are an enlarged view of the steps according to the embodiment showed in FIG. 2.

In FIG. 1, reference numeral 1 denotes a precharged ground coffee capsule according to the present invention; said capsule comprises a substantially frustoconical shaped container body 101 having an open end. Said body 101 is made of an impermeable material such as, for example, a sheet metal and particularly aluminium, and it has a large axial opening 111 formed in a bottom wall thereof. The body 101 has a plastic material layer on the inner side thereof, and a filtering permeable material 301 is heat-welded at an opening 111 formed in the bottom wall of the internal cavity 151 of the body 101 through such plastic material layer. Similarly, a radial flange 121 projecting outwardly from the trailing edge of said cavity 151 enables such filtering permeable material layer 401 to be heat-welded; a ground coffee dose 2 is filled within the capsule 1.

FIG. 2 schematically shows the steps of a first embodiment of the method for producing precharged ground coffee capsules according to the present invention; a roll 1100 feeds a sheet metal ribbon 100 coated with a thermoplastic material layer to a station 10, where the cavity 151 of the container body 101 is punched. The bottom wall of the container body 101 is sheared in a subsequent station 20, then the filtering permeable material 300 fed by the roll 1300 is sheared in a subsequent station 30. Subsequently, the filtering material is welded to the bottom of the body 101 in station 40, then the cavity 151 is filled with ground coffee in station 50; after pressing of the ground coffee in station 60, a filtering material layer is sheared from a ribbon 400 fed by a roll 1400 (station 70). In the next step, the filtering material layer is welded to the top trailing edge of the body 101 in station 80, the ribbon around the body 101 is sheared in station 90, and finally the so-formed capsule 1 is released.

FIG. 3 shows the first three steps of the method according to the present invention, along with their corresponding operating stations; station 10 comprises a punch 11 and a die 13 which are provided with a punch head 12 and a cavity 14 respectively, and they co-operate to punch the cavity 151 of the container body 101 from the continuous ribbon 100. In the next station 20, a shearing punch 21 and a matrix 23 co-operate to shear the bottom of the cavity 151 of the body 101, resulting in an opening 111 and a corresponding scrap 131. The shearing punch 21 is provided with a shearing head 22 which co-operates with an axial through-bore 24 of the matrix 22; the scrap 131 is discharged through a discharge duct 25 which is coaxial with the bore 24. In the next step, a shearing punch 31 and a matrix 33 co-operate to shear a filtering permeable material piece 301 from the ribbon 300. A shearing head 32 of the shearing punch co-operates with an axial through-bore 34 of the matrix, and the filtering permeable material piece 301 is discharged to the bottom of the cavity 151, over the opening 111, through a duct 35.

Figure 4:
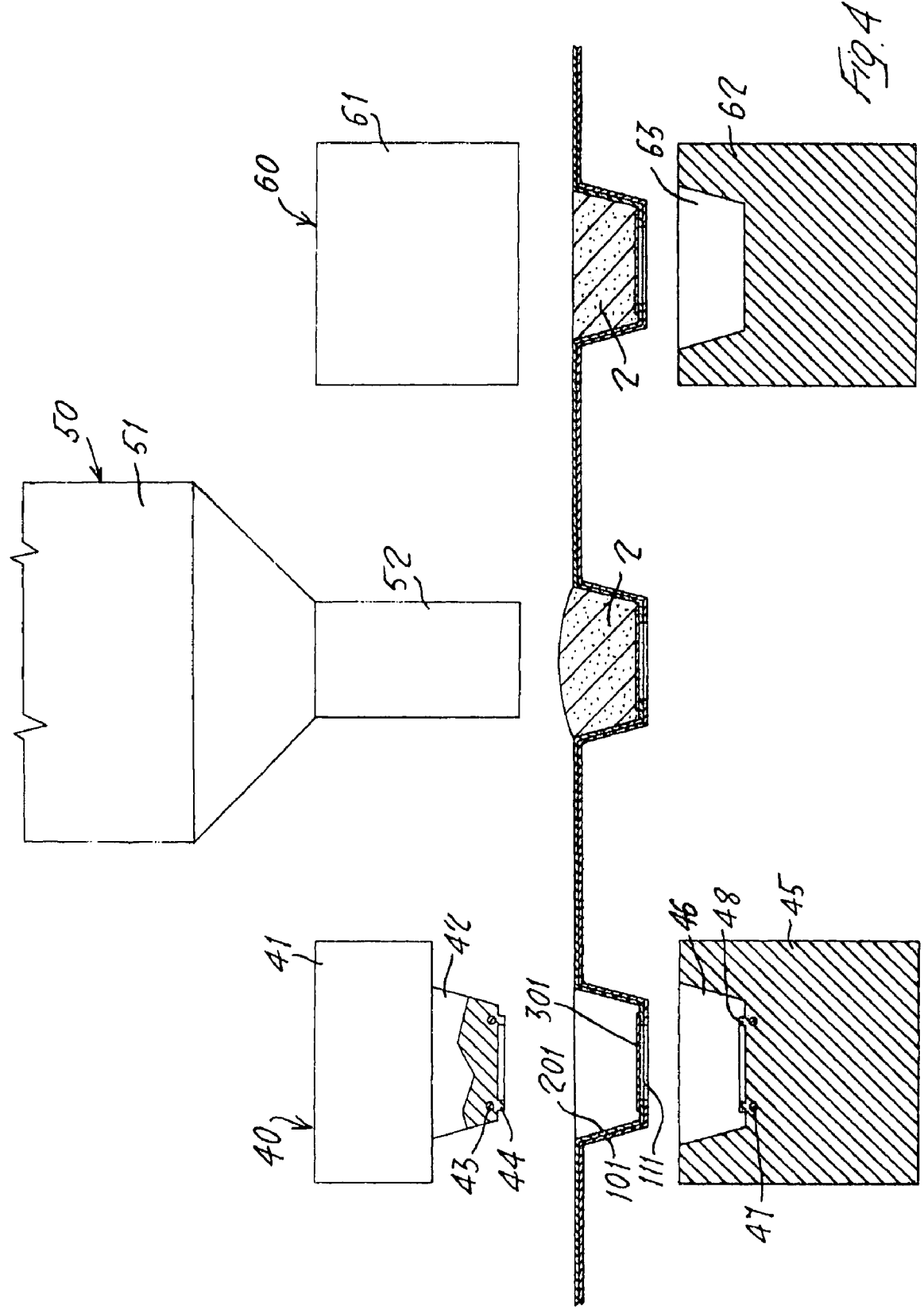

FIG. 4 shows the next three steps of the method according to the present invention; station 40 comprises a punch 41 and a die 45. The punch is provided with a welding head 42 comprising heating means 43 and an annular projection 44; similarly, the die 45 is provided with a cavity 46 comprising heating means 47 and an annular projection 48 in the bottom thereof. By heating the annular projections of the welding head 42 and of the cavity 46 respectively, the thermoplastic material layer 201 is molten and makes the permeable material layer 301 to be fixed to the edge of the opening 111. Subsequently, the container body 101 is moved to station 50, which houses a coffee grinding assembly 51 provided with a dosing hopper 52 which discharges a ground coffee dose 2 into the cavity 151 of the container body 101. The dose 2 is pressed by pressing means 61, the body 101 being positioned in a cavity 63 of a support 62 (station 60).

Figure 5:
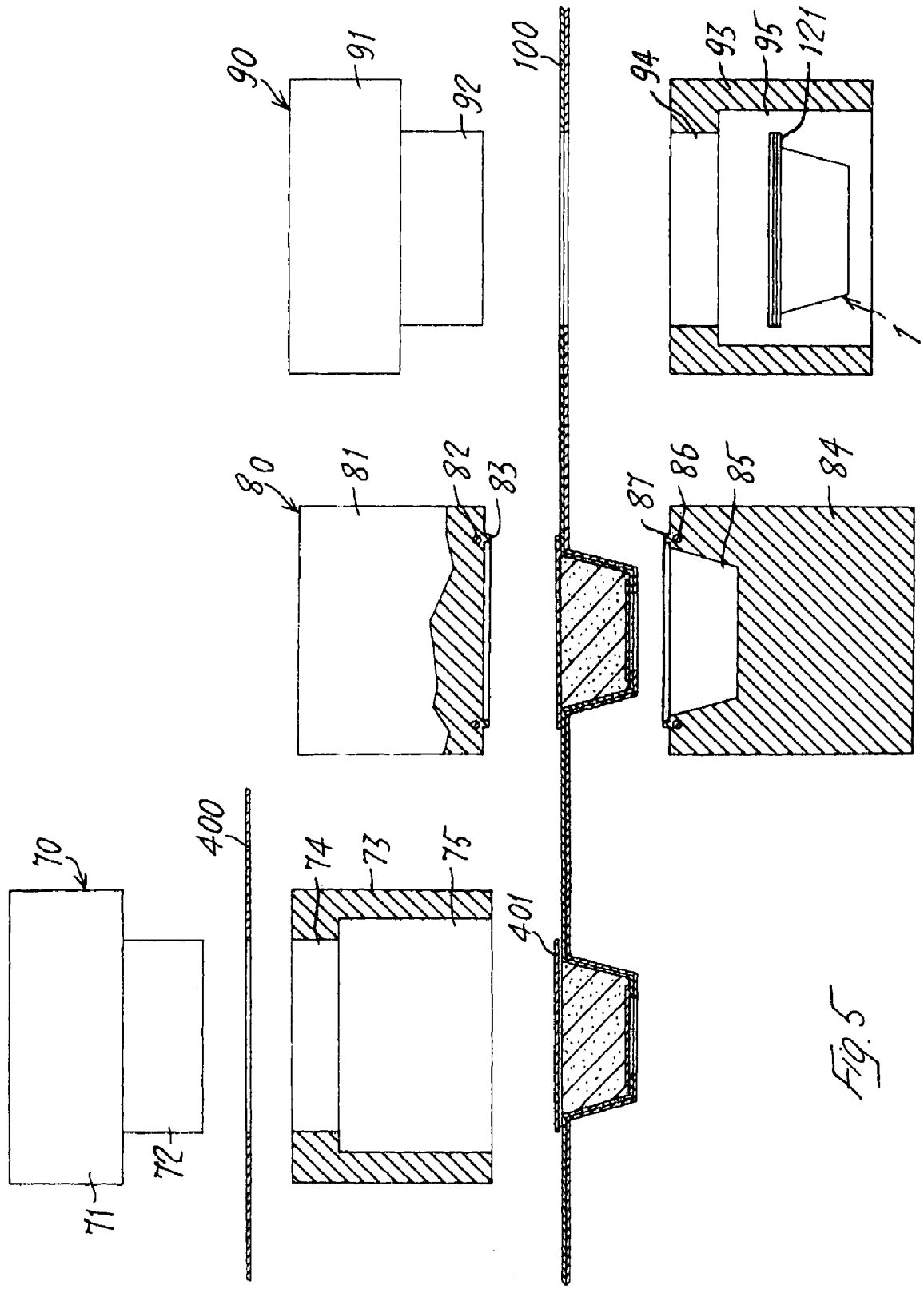

FIG. 5 shows the last three steps of the method according to the present invention; station 70 houses a shearing punch 71 which co-operates with a matrix 73 to shear a permeable material piece 401 from the ribbon 400 through a shearing head 72; the permeable material piece 401 falls through a conduit 75 across the matrix and onto the top of the container body 101 filled with the previously pressed ground coffee dose 2. Subsequently (station 80), a welding head 81 provided with heating means 82 and an annular projection 83 co-operates with the cavity of a die 84 whose trailing edge comprises an annular projection 87 under which heating means 86 are provided. Similarly to station 40, the filtering permeable material is also welded to the metallic support by exploiting the thermoplastic character of its inner coating 201. In the last step of the method according to the invention (station 90), a shearing punch 91 co-operates with a matrix 93 to separate the precharged capsule 1 from the metallic foil ribbon 100. A shearing head 92 co-operates with an axial bore 94 of the matrix to carry out the cutting step, and the capsule 1 is released through a conduit 95 of the matrix itself. The capsule is now provided with the radial flange 121, as already previously described referring to FIG. 1, and this radial flange enables the capsule to be sealed into the device used for preparing a coffee brew, whether it is an espresso coffee machine or a moka type coffee machine, or the like.

FIG. 6 shows a variant embodiment of the method according to the present invention; in this variant embodiment, after welding of the permeable material piece 301 to the edge of the opening 111 in station 40 (see FIG. 2), the container body 101 is separated from the metal sheet ribbon 100 before being filled in station 50 as previously described. That is, a station 140 is added, and this station comprises a shearing punch 141 having a shearing head 142, and a matrix 143 having a through-bore 144, and the shearing head 142 co-operates with the through-bore 144 to shear the container body 101 from the ribbon 100. Subsequently, the container body 101 is dropped onto a transport line 500 which can be of any suitable construction; the subsequent stages are substantially the same as those previously described herein except that, of course, the container body is not transported by the same metal sheet from which said body was obtained in the first station (station 10, see FIG. 2). Also note that, in order to make the transportation of container body 101 easier, the radial flange 161 obtained by the shearing step in station 140 is considerably larger (i.e. about twice) than the flange 131 obtained at the end of processing.

In both embodiments of the method according to the invention, the so-produced capsules can be subsequently treated according to per se known methods, which are not illustrated and described herein in further detail, to enhance their preservation. Preferably, single capsules will be packaged in vacuo or under an atmosphere of an inert gas such as, for example, nitrogen, using a suitable packaging material.

The precharged capsule according to the present invention solves several problems affecting precharged capsules known in the previous art; first, due to its functional simplicity, it can be easily used with different types of devices adapted to prepare coffee brews, since it simply and only needs means for supplying water and means for gathering the coffee brew. Furthermore, the capsule is structurally robust, and this feature assures its integrity and makes its storage considerably simple. Another important aspect is provided by the construction structure of the capsule. The plastic material layer avoids a direct contact between ground coffee and metal, which is detrimental for both. Finally, the use of an inner layer of plastic material allows for a simple coupling with the filtering permeable material during the assembly procedure. The shape of the container body can be the shape which is most advantageously adapted to the process for production thereof, frustoconical and cylindrical shapes are preferred, but the container body can also have a polygonal section, e.g. the shape of a frusto-pyramid with a regular or irregular polygonal base.

The method according to the present invention has several clear advantages from the process economy point of view; indeed, the whole process is carried out in one apparatus which can be made extremely compact, and the process system is continuous, resulting in a high yield. As for the first variant embodiment, it is completely clear that using the metal sheet ribbon 100, from which the container body 101 is obtained, as process transport line considerably simplifies the process. As for the second variant shown in FIG. 5 of the accompanying drawings, it is necessary to consider an aspect observed during the study which led to the present invention. It was noted that the "slow" step of the process was that of station 50, i.e. the step where the container body 101 is filled with the ground coffee dose; accordingly, it was considered that, by separating the container body from the metal sheet ribbon in a step just before this filling step, it was possible to obtain two different lines for the subsequent steps, resulting in an increased yield of the apparatus.

Finally, as for both variant embodiments of the method according to the present invention, using a metallic foil provided with a thermoplastic material layer considerably simplifies the fixing operations for the permeable material, which can be consequently chosen from materials such as paper, a non-woven fabric made of natural fibers, or the like.

What is claimed is:
1. A coffee capsule, comprising
    a container body forming in its upper portion an open end for receiving water and forming in its lower portion an opening for discharging coffee brew, the container body terminating at a position in proximity to said open end with an outwardly projecting radial flange; and
    further comprising a first wall being a separate part from said container body; and a second wall being a separate part from said container body;
wherein
    said container body has a polygonal cross section;
    said container body is made of a liquid-impermeable material consisting of a first layer made of a metallic material, said first layer facing the exterior of said container body, and a second layer made of a thermoplastic material, said second layer facing the interior of said container body;
    said first wall is made of a single layer of liquid-permeable material;
    said second wall is made of a single layer of liquid-permeable material;
    said first wall is heat-welded to said second layer of said container body in its upper portion at said outwardly projecting radial flange, whereby covering said open end from an outside of said container body; and
    said second wall is heat-welded to said second layer of said container body in its lower portion, whereby covering said opening from an inside of said container body.

2. The coffee capsule of claim 1, wherein said container body is tapered towards said lower portion.

3. The coffee capsule of claim 1, wherein said metallic material is aluminum.

4. The coffee capsule of claim 3, wherein said liquid-permeable material is paper.

5. The coffee capsule of claim 3, wherein said liquid-permeable material is a non-woven fabric made of natural fibers.

6. A method for producing the coffee capsule of claim 1, said method comprising the steps of:
    (a) feeding a continuous ribbon of liquid-impermeable material (100) and punching a cavity (151) forming a container body (101);
    (b) shearing an axial opening (111) in the bottom wall of said cavity (151);
    (c) feeding a continuous ribbon of liquid-permeable material (300) and shearing a piece of liquid-permeable material (301), said piece of liquid-permeable material (301) being disposed in the bottom of said cavity (151);
    (d) welding said piece of liquid-permeable material (301) to the bottom of said cavity (101);
    (e) filling said cavity (151) with a ground coffee dose (2);
    (f) pressing said ground coffee dose (2) into said cavity (101);
    (g) feeding a continuous ribbon of liquid-permeable material (400) and shearing a piece (401) of said liquid-permeable material, said piece of liquid-permeable material (301) being disposed over said filled cavity (151);
    (h) welding said piece of liquid-permeable material (401) to the top of said cavity (151); and
    (i) shearing said liquid-impermeable material and releasing the so-formed ground coffee precharged capsule (1).

7. The method according to claim 6, wherein said liquid-impermeable material comprises a metallic support and a thermoplastic material layer (201) facing the interior of said container body (101).

8. The method according to claim 6, wherein said piece of liquid-permeable material (401), which is disposed over said cavity filled with ground coffee, has a diameter substantially greater than said cavity (151).

9. The method according to claim 8, wherein shearing of said liquid-impermeable material forms an outwardly projecting radial flange (121), said shearing being substantially carried out at the diameter of said liquid-permeable material piece (401).

10. The method according to claim 6, wherein, after welding of said piece of liquid-permeable material (301) to the bottom of said cavity (151) and before filling of said cavity (151) with a ground coffee dose (2), a step of shearing said liquid-impermeable material is provided.

11. The method according to claim 10, wherein said shearing step is carried out so that a radial flange (161) projecting outwardly from said container body (101) is formed, said flange (141) extending to a length which is at least one half of the height of said container body (101).

12. An apparatus for producing a coffee capsule of claim 1, said apparatus comprising:
   (a) feeding means (1100) for feeding a continuous ribbon of liquid-impermeable material (100);
   (b) punching means (11, 12, 13, 14) for punching a cavity (151) in said continuous ribbon;
   (c) shearing means (21, 22, 23, 24) for shearing an opening (111) in the bottom of said cavity (151), and discharging means (25) for discharging a corresponding scrap (131);
   (d) feeding means (1300) for feeding a continuous ribbon of liquid-permeable material (300);
   (e) shearing means (31, 32, 33, 34) for shearing a piece of liquid-permeable material (301), and positioning means (35) for positioning said piece of liquid-permeable material (301) within said cavity (151);
   (f) welding means (41, 42, 43, 44, 46, 47, 48) for welding said piece of liquid-permeable material (301) to said cavity (151);
   (g) feeding means (51) and dosing means (52) for feeding and dosing ground coffee in said cavity respectively;
   (h) pressing means (61, 62, 63) for pressing a ground coffee dose (2) into said cavity (151);
   (i) feeding means (1400) for feeding a continuous ribbon of liquid-permeable material (400);
   (j) shearing means (71, 72, 73, 74) for shearing a piece of liquid-permeable material (401), and positioning means (75) for positioning said piece of liquid-permeable material (401) over said cavity (151) filled with said pressed ground coffee dose (2);
   (k) welding means (81, 82, 83, 84, 85, 86, 87) for welding said piece of liquid-permeable material (401) to said liquid-impermeable material; and
   (l) shearing means (91, 92, 93, 94) for shearing said liquid-impermeable material, and releasing means (95) for releasing the so-formed ground coffee precharged capsule (1).

13. The apparatus according to claim 12, wherein shearing means (141, 142, 143, 144) for shearing said liquid-impermeable material are provided between said welding means (41, 42, 43, 44, 46, 47, 48) for welding said liquid-permeable material piece (301) to said cavity (151), and said feeding means (51) and dosing means (52) for feeding and dosing ground coffee respectively, said shearing means being adapted to shear said material at a given distance from the outlet edge of said cavity (151), such as to form a container body (101) provided with a radial flange (161) projecting outwardly to a length which is at least one half of the height of said container (101), releasing means (145) for releasing said container body (101) and a transport line (500) for transporting said container body (500) to subsequent process steps being provided.

* * * * *